J. A. WALLIS.
VEHICLE SPRING.
APPLICATION FILED JAN. 22, 1921.
1,403,928.
Patented Jan. 17, 1922.
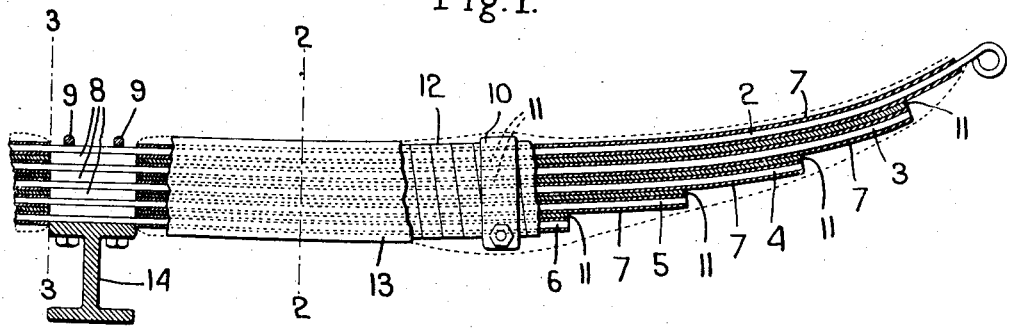
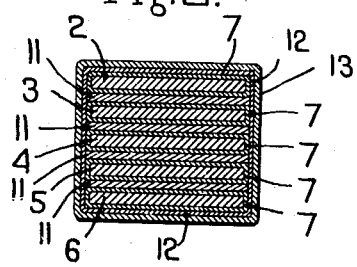
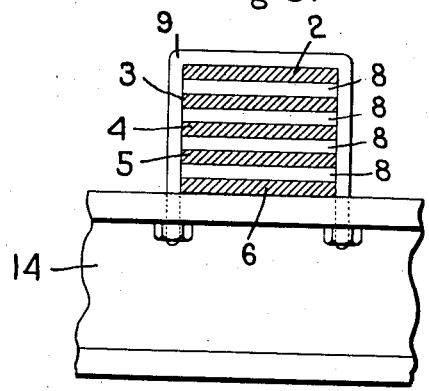
Inventor.
Joseph A. Wallis
by Heard Smith & Tennant.
Attys.

UNITED STATES PATENT OFFICE.

JOSEPH A. WALLIS, OF BEVERLY, MASSACHUSETTS.

VEHICLE SPRING.

1,403,928.  Specification of Letters Patent.  Patented Jan. 17, 1922.

Application filed January 22, 1921. Serial No. 439,246.

*To all whom it may concern:*

Be it known that I, JOSEPH A. WALLIS, a citizen of the United States, and resident of Beverly, county of Essex, State of Massachusetts, have invented an Improvement in Vehicle Springs, of which the following description, in connection with the accompanying drawing, is a specification, like characters on the drawing representing like parts.

This invention relates to vehicle springs of that type comprising a plurality of leaves, and it has for its principal object to provide an improved spring which is water proof thus making it impossible for moisture to get between the leaves of the spring and cause rust.

Another object of the invention is to provide an improved vehicle spring in which the leaves are separated and held out of contact with each other thus avoiding the rubbing action which normally occurs between the leaves of the spring as the latter flexes.

Another object of the invention is to provide an improved vehicle spring in which the spaces between the separated leaves are filled with rubber or some similar material and in which the assembled leaves are enclosed in a water proof material preferably of rubber.

Other objects of the invention are to improve generally vehicle springs all as will be more fully hereinafter set forth.

In order to give an understanding of my invention I have illustrated in the drawings an automobile spring embodying the invention which will now be described after which the novel features will be pointed out in the appended claims.

Fig. 1 is a side view of one end of a spring having my improvements applied thereto.

Fig. 2 is an enlarged section on the line 2—2, Fig. 1.

Fig. 3 is a section on the line 3—3, Fig. 1.

The spring is of the usual type comprising a plurality of leaves, 2, 3, 4, 5, and 6, these leaves having a varying length as is usual in automobile springs of this type.

The leaves are held separated from each other throughout the entire length of the spring so that there is no metal to metal contact in the portions of the spring that flex. At the center of the spring where it is attached to the automobile axle 14 these separated leaves are spaced by means of spacing blocks 8. Throughout the rest of the length of the spring the leaves are separated by means of a filling of rubber or similar material 11 which is situated between and fills the spaces between the leaves. In order that this filling material may function properly it is necessary, of course, that it should be retained in place, and such retention of the filling material may be accomplished in various ways depending upon the character of said filling material. In the preferred embodiment of my invention I propose to hold the leaves separated by a filling of rubber and one way of securing the rubber to the spring so that it will remain in position is to encase each spring in a layer of fabric 7 to which is secured a layer of rubber. In making a spring in this way the fabric layers and the rubber could be assembled with the spring leaves and then the whole suitably cured or vulcanized. This provides a spring in which each leaf is encased in a rubber casing so that there is no metal to metal contact. The rubber between the leaves however is of sufficient thickness and flexibility to allow of the relative movement of the leaves when the spring is flexed.

I also propose to apply an exterior layer of rubber to the spring and this can conveniently be done by first winding the automobile leaves with a tape 12 and then applying a coating or layer 13 of rubber to the exterior of the tape. This rubber layer may also be cured or vulcanized if desired.

A spring thus made has the separated leaves spaced from each other throughout their length and at the portion of the spring where the leaves move relative to each other when the spring flexes, the spacing material is of rubber or some elastic material which will give and allow the necessary relative movement between the leaves. A spring having this construction will be noiseless because there is no metal-to-metal rubbing contact. It will always have its full resilient capacity because it can never become rusted as many springs do.

I have shown at 10 the usual clip which embraces the leaves of the spring and serves to keep them in proper position relative to each other.

Although I have shown a construction wherein the fabric 7 is used for assisting in holding the rubber filling in place yet I do not wish to be limited to this construction, as any suitable means for attaining this end may be employed.

I claim:

1. In a vehicle spring, the combination with a plurality of leaves, and a rubber casing enclosing the assembled leaves and vulcanized thereon.

2. In a vehicle spring, the combination with a plurality of leaves, separated from each other, of a filling of resilient material between the separated leaves, and a rubber casing enclosing the spring and vulcanized thereon.

3. In a vehicle spring, the combination with a plurality of leaves, of a fabric casing enclosing each leaf, a wrapping of tape or similar material wound about the assembled leaves, and a water proof casing on the outside of the wrapping.

4. In a vehicle spring, the combination with a plurality of leaves, of a fabric casing enclosing each leaf, a wrapping of tape or similar material wound about the assembled leaves, and a rubber covering enclosing the wrapped spring and vulcanized thereto.

In testimony whereof, I have signed my name to this specification.

JOSEPH A. WALLIS.